2 Sheets—Sheet 2.
B. C. BRADLEY.
Sulky-Plow.
No. 219,799. Patented Sept. 23, 1879.
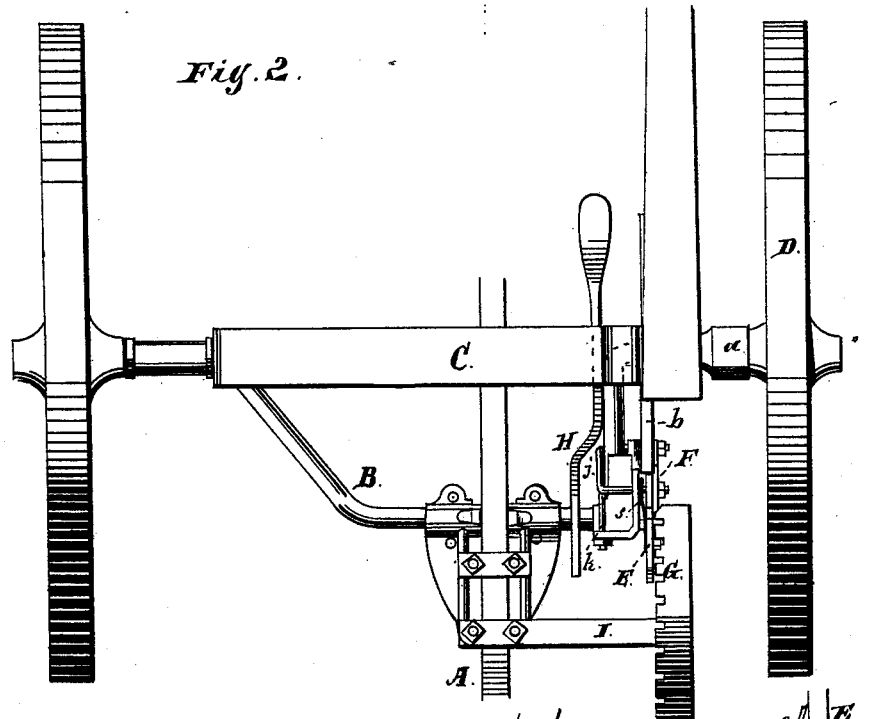
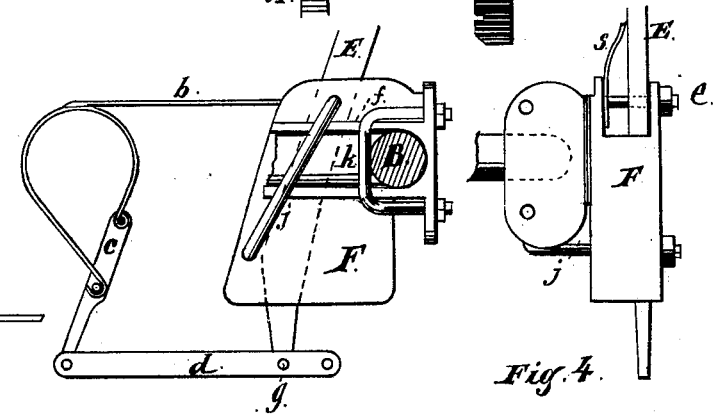
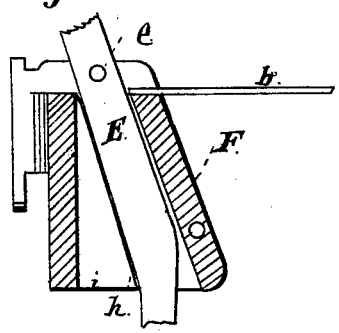
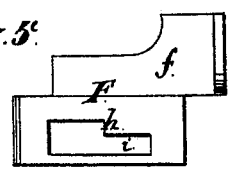
Witnesses:
Inventor:
Byron C. Bradley,
By West & Bond, Attys.

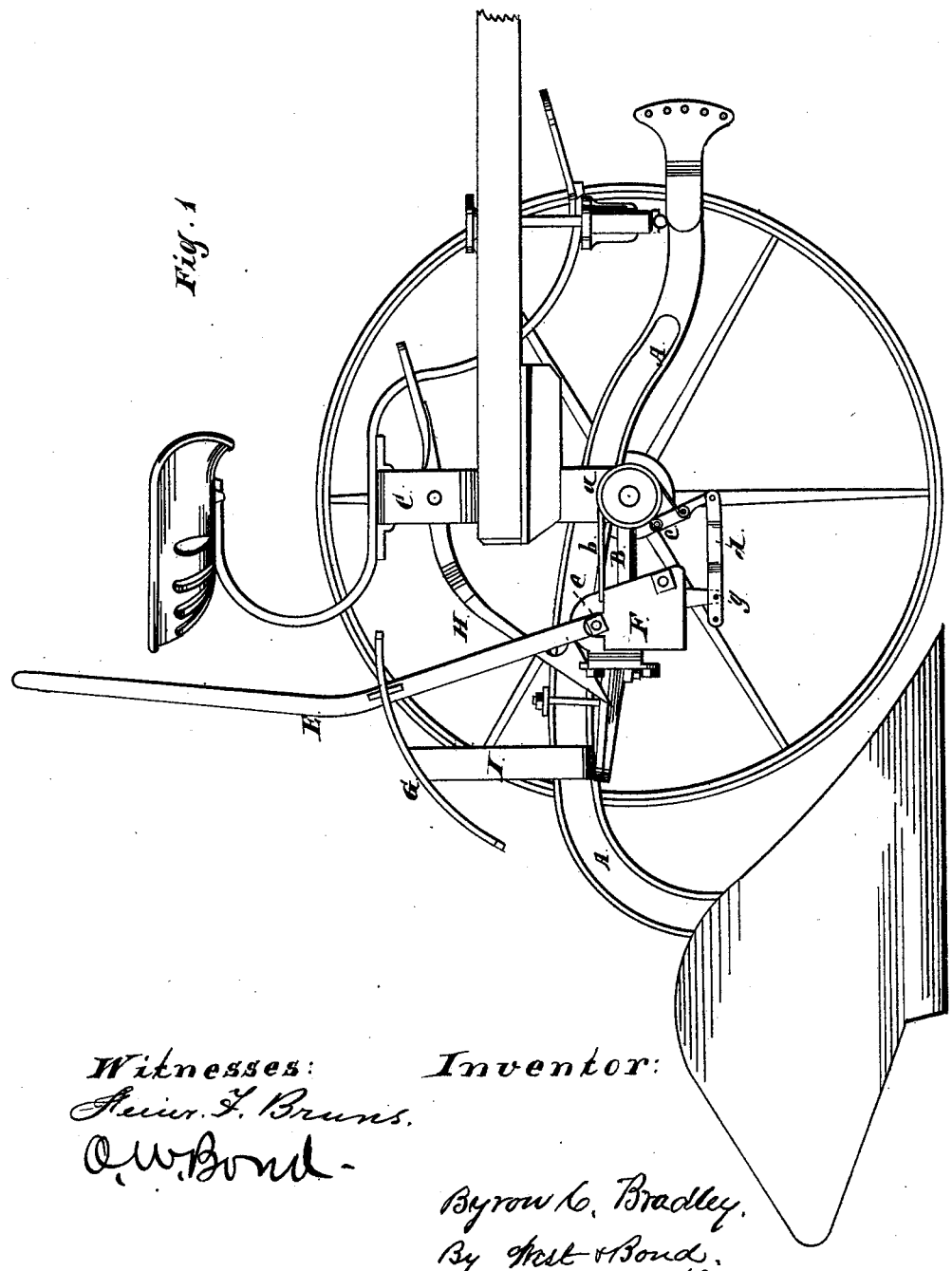

UNITED STATES PATENT OFFICE.

BYRON C. BRADLEY, OF CHICAGO, ILLINOIS.

IMPROVEMENT IN SULKY-PLOWS.

Specification forming part of Letters Patent No. 219,799, dated September 23, 1879; application filed July 14, 1879.

*To all whom it may concern:*

Be it known that I, BYRON C. BRADLEY, of Chicago, Cook county, State of Illinois, have invented a new and useful Improvement in Sulky-Plows, of which the following is a full description, reference being had to the accompanying drawings, of which there are two sheets, in which—

Figure 1 is a side elevation with one wheel removed. Fig. 2 is a plan with some of the parts removed. Fig. 3 is an enlarged detail taken at line $x$ of Fig. 2. Fig. 4 is a rear view of the principal parts shown in Fig. 3. Fig. 5 is a bottom view of that part through which the operating-lever passes, showing the form of the hole through the same at the bottom; Fig. 6, an inside view of the casting F.

This invention relates to devices for raising the plow out of the ground when desired, and also for holding it in any given position when in use.

I use a friction-band on the hub, connected with the crank-axle somewhat as shown in a pending application made by myself and Charles A. Hague. I have now constructed a lever and parts connected therewith, so that by the use of this lever the friction-band can be tightened on the hub for the purpose of raising the plow out of the ground by the movement of the machine. In case the friction-band should not operate from any cause, the construction is such that the operator can raise the plow out of the ground by the use of the same lever; and by means of the same lever the plow can be set so as to run at any given depth. Thus by the use of a single lever I am able to accomplish three several objects, as specified.

In the drawings, A represents a plow-beam, which is secured to the crank-axle B in any suitable manner. The main-frame C, the tongue, wheels, driver's seat, and other parts which are not specifically described may be made substantially in any known manner.

$a$ is an extension of the hub of the wheel D, or it may be a separate piece suitably connected with the hub. $b$ is a friction-band encircling the inner end of the hub-extension $a$. $c$ is a short lever, to the upper end of which one end of the friction-band $b$ is pivoted, and the other end of $b$ is pivoted upon a pin near the center of the lever $c$. The lower end of this lever $c$ is pivoted to the arm or bar $d$.

E is a lever. F is a hollow piece of metal secured to the crank-axle, and, as shown, to that part which is nearly parallel with the plow-beam. $f$ is a flange on F, which aids to hold it in place on the axle. The lever E passes through this piece F, to the upper end of which it is pivoted at $e$, and the lower end of the lever is pivoted to the arm $d$ at $g$. The lever has a little lateral movement on the pivot at $e$.

The opening through F is contracted or partly closed at the bottom, as shown in Fig. 5, and the lever E can be brought into contact either with the shoulder $h$ or it can be made to pass such shoulder.

$s$ is a spring. The upper end is secured to the inside of the lever E, and its lower end is placed within the opening in F; and this spring holds the lever E in the position shown in Fig. 4, except when forcibly changed. G is a rack, with which the lever E engages, as is usual. H is a hook. It holds the axle after it has been turned up in the usual manner.

As shown, the piece F is secured to the axle by the two clips, $j$ $k$. The rack G is supported on the bar I, which is secured to the plow-beam. The upper end of the lever E is to be within easy reach of the driver.

The operation is as follows: To cause the plow to be raised out of the ground by the action of the machine, the driver must release the lever E from the rack G. Then, by pulling the lever forward, the band $b$ will be tightened upon the hub or extension $a$, and when the friction between the band and hub becomes sufficient the band and hub will move together, the axle will rotate with the hubs, and the crank part of the axle will be elevated, lifting the plow out of the ground—it being of course understood that the team and plow must be in motion while this is being done. When the plow has been sufficiently raised the hook H will engage with the axle and hold it up until the hook is released. While the plow is being raised in this manner the lower end of the lever E must be thrown out, so that it will not engage with the shoulder $h$, but will be in the opening $i$.

If from any cause the friction-band should be in an inoperative condition, or fail to operate, the driver can raise the plow out of the ground by means of the lever E alone, without the friction-band, by bringing the lever E into such a position that its lower end will engage with the shoulder $h$. Then the plow can be raised out of the ground by pulling the upper end of the lever forward. By means of the same lever E and the rack G the plow can be adjusted to plow at any required depth. Thus the single lever E can be used for applying the friction-band $b$ to the hub for the purpose of raising the plow out of the ground by the movement of the machine. By means of the same lever the operator can raise the plow out of the ground without the use of the friction-band, and by the same lever, in connection with the rack G, the plow can be set to run at any given depth.

It is not necessary that the casting F be used as shown, though it furnishes a convenient way of providing for the several movements of the lever E. It is essential that this lever be so arranged that it can have such freedom of movement as is required to apply the friction-band to the hub $a$, and that some stop corresponding with the shoulder $h$ be provided, with which the lower end of such lever can be made to engage when the plow is to be raised by the driver without the use of the friction-band.

When the hub is made in two parts the extension and main hub may be connected for use by means of lugs on the extension and hub proper, and then the operator can raise the plow out of the ground when the machine is not in motion, either by the use of the friction-band or without using such band.

What I claim as new, and desire to secure by Letters Patent, is as follows:

1. In a sulky-plow, the lever E, in combination with a friction-band, $b$, and a shoulder or stop, $h$, all so constructed that the lever E can be used to apply the friction-band to the hub, and also for raising the plow by the action of the operator alone, substantially as specified.

2. In a sulky-plow, the lever E, in combination with the friction-band $b$, shoulder or stop $h$, and rack G, substantially as and for the purposes specified.

3. In a sulky-plow, the lever E, in combination with the casting F, provided with a shoulder or stop, $h$, substantially as specified.

BYRON C. BRADLEY.

Witnesses:
E. A. WEST,
O. W. BOND.